United States Patent
Jablonski et al.

(10) Patent No.: US 9,586,480 B2
(45) Date of Patent: Mar. 7, 2017

(54) AUTOMOBILES, AUTOMOBILE INSTRUMENTS, AND USER INTERFACES FOR CONTROLLING AUTOMOBILE EQUIPMENT

(71) Applicant: GM GLOBAL TECHNOLOGY OPERATIONS LLC, Detroit, MI (US)

(72) Inventors: Robert C. Jablonski, Rochester Hills, MI (US); Fred W. Huntzicker, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 31 days.

(21) Appl. No.: 14/703,984

(22) Filed: May 5, 2015

(65) Prior Publication Data

US 2016/0325625 A1    Nov. 10, 2016

(51) Int. Cl.
    *B62D 25/14*    (2006.01)
    *B60K 37/06*    (2006.01)
    *B60Q 3/04*     (2006.01)
    *B60R 16/023*   (2006.01)

(52) U.S. Cl.
    CPC .............. *B60K 37/06* (2013.01); *B60Q 3/044* (2013.01); *B60R 16/0231* (2013.01); *B60K 2350/102* (2013.01); *B60K 2350/302* (2013.01)

(58) Field of Classification Search
    CPC .............. B60K 37/06; B60K 2350/102; B60K 350/302; B60Q 3/044; B60R 16/0231
    See application file for complete search history.

(56) References Cited

U.S. PATENT DOCUMENTS

| | | | | |
|---|---|---|---|---|
| 3,299,423 | A * | 1/1967 | Chapsky | G01F 15/063 341/10 |
| 4,006,638 | A * | 2/1977 | Woelfl | G01L 9/0088 73/387 |
| 2008/0012376 | A1* | 1/2008 | Gresham | B60K 37/00 296/37.12 |
| 2013/0229783 | A1* | 9/2013 | Fendeleur | B60K 37/06 362/23.04 |
| 2016/0077588 | A1* | 3/2016 | Adams | G06F 3/016 345/174 |

* cited by examiner

*Primary Examiner* — Lori L Lyjak
(74) *Attorney, Agent, or Firm* — Lorenz & Kopf, LLP

(57) ABSTRACT

Automobiles, automobile instruments, and user interfaces for controlling automobile equipment are provided. A user interface for controlling automobile equipment includes a circuit board accommodating an encoder circuit. Further, the user interface includes a dial mounted independent of the circuit board. The dial is moveable in response to manipulation by a user of the automobile equipment. The dial communicates electronically with the encoder circuit.

20 Claims, 3 Drawing Sheets

AUTOMOBILES, AUTOMOBILE INSTRUMENTS, AND USER INTERFACES FOR CONTROLLING AUTOMOBILE EQUIPMENT

TECHNICAL FIELD

The technical field generally relates to automobile instrumentation, and more particularly relates to instrumentation on an instrument panel for manipulation by a user in the passenger compartment of an automobile.

BACKGROUND

Rotary dial switches are widely used in the automobile industry. A common example of such a rotary dial switch is a headlight switch that controls the automobile headlights and parking lights responsive to push-pull movement of the actuator knob. Such a switch may also control the interior dome light and the intensity of instrument panel illumination by angular rotation of the actuator knob.

It is common for the actuator knob of an automotive electrical switch to bear various switch indicia to indicate the switching functions controlled by the switch. For example, such switch indicia includes recognized symbols for fog lights, headlights, etc.

Such rotary dial switches have been effectively employed in automobiles to the point that they have become commonplace. Further, the aesthetics of rotary dial switches generally have not changed. Such switches are somewhat limited to aesthetic features as they basically include a rotatable outer rim and an interior face that may include the switch indicia noted above.

Accordingly, it is desirable to provide improved automobile instruments and automobiles with such improved instruments. In addition, it is desirable to provide improved user interfaces for controlling automobile equipment. Furthermore, other desirable features and characteristics will become apparent from the subsequent detailed description and the appended claims, taken in conjunction with the accompanying drawings and the foregoing technical field and background.

SUMMARY

User interfaces for controlling automobile equipment are provided. In one embodiment, a user interface for controlling automobile equipment includes a circuit board accommodating an encoder circuit. Further, the user interface includes a dial mounted independent of the circuit board. The dial is moveable in response to manipulation by a user of the automobile equipment. The dial communicates electronically with the encoder circuit.

An automobile instrument is provided in another embodiment. In one embodiment, an automobile instrument includes an instrument panel having a front surface. The automobile instrument further includes an arm extending from the front surface of the instrument panel. Also, the automobile instrument includes a rotary dial mounted to the arm and separated from the front surface of the instrument panel by a distance. A void is defined between the front surface of the instrument panel and the rotary dial.

In another embodiment, an automobile is provided. The automobile includes a passenger compartment and an instrument panel adjacent the passenger compartment. The automobile also includes a circuit board accommodating an encoder circuit and positioned within the instrument panel. Further, the automobile includes a rotary dial mounted independent of the circuit board. The rotary dial is moveable in response to manipulation by a user. Also, the rotary dial communicates electronically with the encoder circuit.

DESCRIPTION OF THE DRAWINGS

The embodiments will hereinafter be described in conjunction with the following drawing figures, wherein like numerals denote like elements, and wherein.

DETAILED DESCRIPTION

The following detailed description is merely exemplary in nature and is not intended to limit the application and uses of embodiments described herein. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Further, various components and features described herein may be referred to using particular numerical descriptors, such as first, second, third, etc., as well as positional and/or angular descriptors, such as horizontal and vertical. However, such descriptors may be used solely for descriptive purposes relating to drawings and should not be construed as limiting, as the various components may be rearranged in other embodiments. It should also be understood that FIGS. 1-5 are merely illustrative and may not be drawn to scale.

Figure 1:
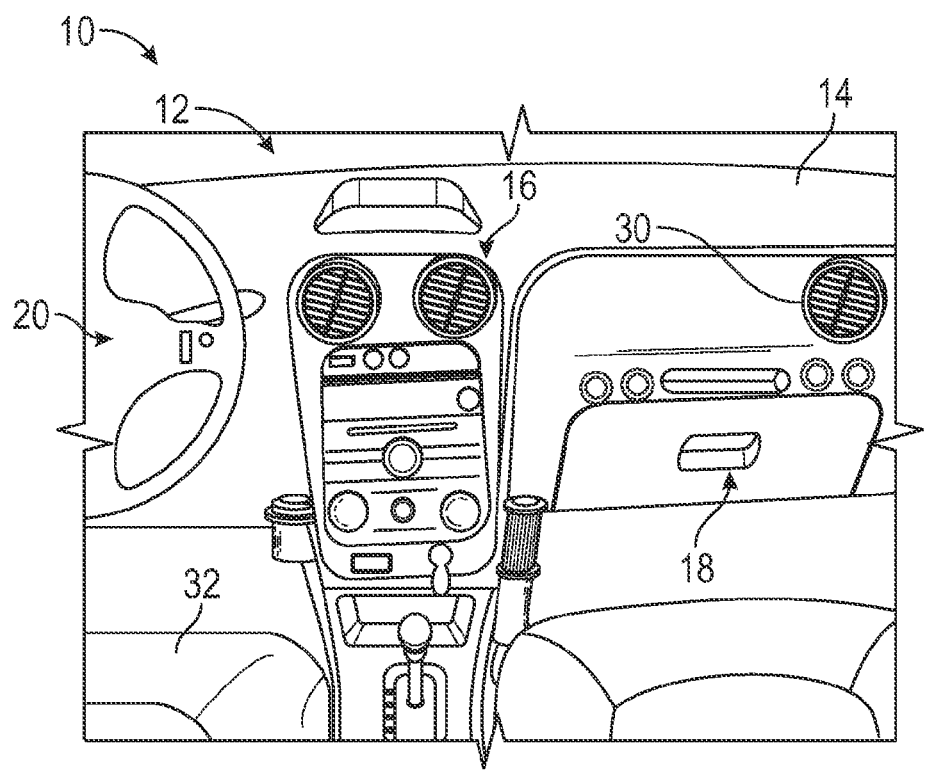
FIG. 1 is a perspective view illustration of a section of a passenger compartment of an automobile in accordance an embodiment.

FIG. 1 is a perspective-view illustration of the forward portion of a passenger compartment in a representative automobile, identified generally as 10. By way of example, and not limitation, embodiments herein can be incorporated into any automobile, such as coupe- or sedan-type passenger cars, trucks, sport utility vehicles (SUVs), heavy duty vehicles, vans, buses, etc. The vehicle 10 includes an interior compartment, such as passenger compartment 12, having vehicle interior structure, which is represented collectively herein by an instrument panel 14 (also known as a "dashboard" or "fascia") including a center console 16, a glove compartment (or "glove box") 18 of conventional design, and a steering wheel assembly, designated generally at 20.

The instrument panel 14 extends transversely across the vehicle 10, at a forward end of the passenger compartment 12. The instrument panel 14 is configured to house various switches, accessories, and instrumentation, including, for example at the driver side, an electronic instrument cluster with various digital and/or analog gauges. These gauges may include a speedometer, odometer, tachometer, as well as other information displays, such as a trip odometer, compass, and fuel level. At the front passenger side, the instrument panel 14 houses heating, ventilation, and air conditioning (HVAC) vents 30, the glove compartment 18, and a passenger-side airbag module (not visible).

The center console 16 originates at the instrument panel 14, and continues beneath it, running rearward in the passenger compartment 12 between front driver and passenger seat assemblies 32. The instrument panel 14 is also designed to cover or conceal various underlying components when installed in the motorized vehicle 10. For instance, the instrument panel 14 overlies a plurality of HVAC ducts, assorted wiring harnesses, and other vehicular componentry such as a circuit board and circuitry (none of which are visible in the illustrations provided).

Figure 2:
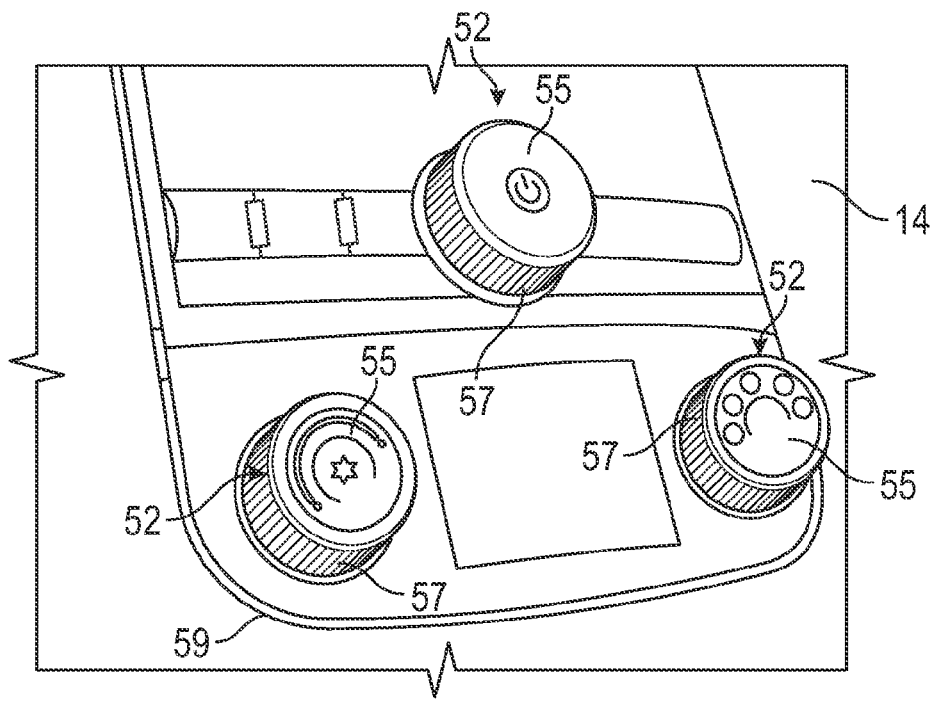
FIG. 2 is a perspective view illustration of the vehicle instrument panel of FIG. 1 in accordance with an embodiment.

In FIG. 2, further details of the instrument panel 14 are shown. As shown, rotary dials or rotary dial encoders 52 are provided for manipulation by a user, whether driver or passenger, to adjust conditions in the automobile 10. For example, a rotary dial encoder 52 may be provided to adjust settings of the radio or music player system, settings of the HVAC system, or other systems. Each rotary dial has a top surface or face 55 and an annular outer sidewall 57. The top face 55 may include buttons or otherwise provide for user input by occupants of the passenger compartment 12 to adjust settings of the rotary dial encoder 52, such as selecting an operating condition for modification. The outer wall 57 may be rotated or otherwise manipulated by occupants of the passenger compartment 12 to modify the value of the selected condition.

Other configurations of the rotary dial encoder 52 may be used. For example, the outer wall 57 may be manipulated to select the condition for adjustment and the top face 55 may receive user input to modify the selected condition. In either case, selective rotation of the annular outer sidewall 57 in the clockwise or counterclockwise direction modifies an operating condition of the vehicle, such as cabin temperature, the heating, ventilation, and air conditioning (HVAC) system fan speed, the stereo volume, station, and other settings, or selects an operating condition for modification.

A conventional rotary dial encoder is an electro-mechanical device that converts the angular position or motion of a shaft or axle to an analog or digital code. There are two main types: absolute and incremental or relative. The output of conventional absolute encoders indicates the current position of the shaft, making them angle transducers. The output of conventional incremental encoders provides information about the motion of the shaft, which is typically further processed elsewhere into information such as speed, distance, and position. As described herein, rotary dial encoders 52 are able to convert the angular position or motion of the annular outer sidewall 57 to an analog or digital code, rather than motion of a shaft—which may not be present in embodiments herein. The rotary dial encoders 52 provided herein may be absolute or incremental.

In FIG. 2, each rotary dial encoder 52 is positioned flush with an outer face 59 of the instrument panel 14. Specifically, an underside of each rotary dial encoder 52 is embedded in the outer face 59 of the instrument panel 14 or is positioned adjacent the outer face 59 of the instrument panel 14 to prevent any obstruction between the rotary dial encoder 52 and the instrument panel 14. However, embodiments herein provide for a rotary dial encoder 52 that is mounted at a distance from the face 59 of the instrument panel 14, and for a rotary dial encoder 52 that may be articulated or otherwise moved from the flush, retracted position shown in FIG. 2 to an extended position in which the rotary dial encoder 52 is positioned at a distance from the face 59 of the instrument panel 14.

Figure 3:
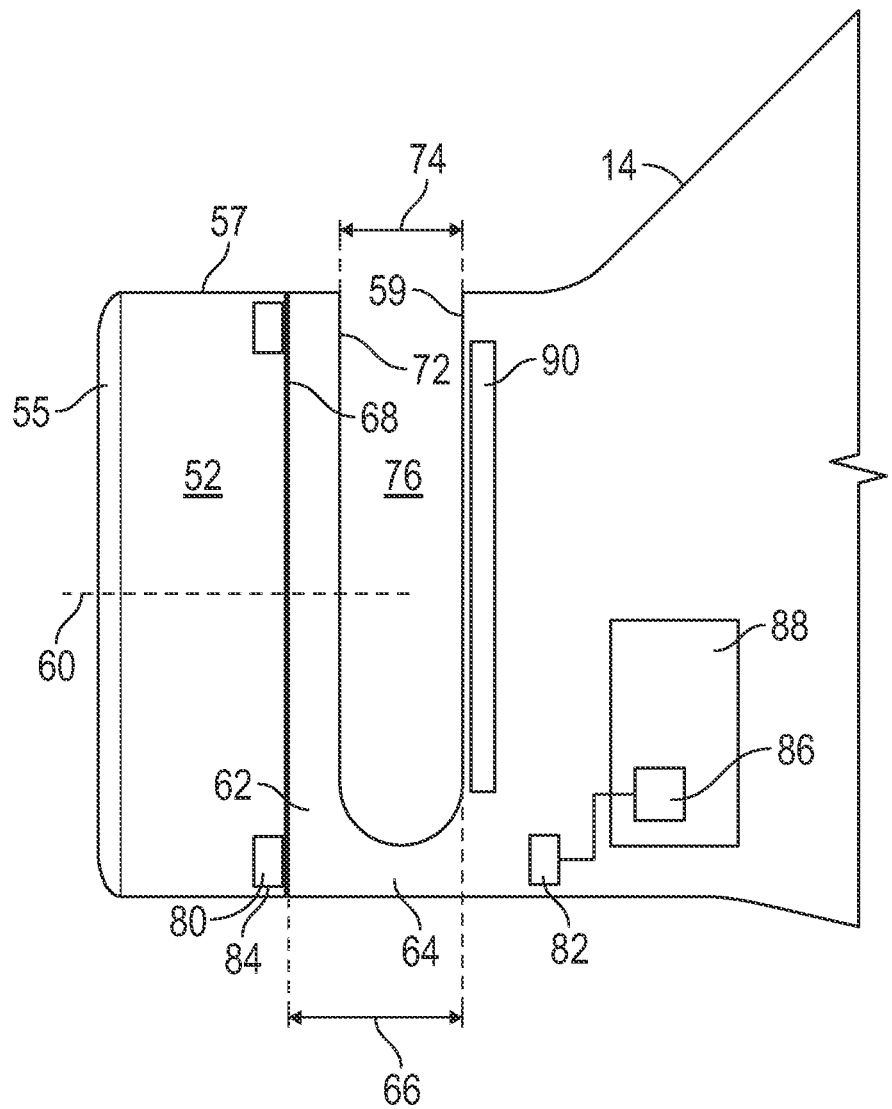
FIG. 3 is a side view schematic illustration of a rotary dial and vehicle instrument panel of FIG. 1 in accordance with an embodiment.

FIG. 3 illustrates a rotary dial encoder 52 positioned at a distance from the face 59 of the instrument panel 14. The rotary dial encoder 52 rotates about axis 60 on a mount or platform 62. For example, platform 62 may include an internal axle (not shown) on which rotary dial encoder 52 sits and around which rotary dial encoder 52 rotates. Platform 62 is separated from the face 59 of the instrument panel 14 by arm 64. The arm 64 may be formed with a circumferential thickness (into and out of the drawing sheet) of less than about 30 degrees around the axis 60. For example, the arm 64 may have a circumferential thickness of less than about 20 degrees, less than about 15 degrees, or less than about 10 degrees around the axis 60. The arm 64 has a minimum circumferential thickness sufficient to withstand use, such as more than about 2 degrees around the axis 60.

The platform 62 and arm 64 may be formed as an integral, unitary piece. Further, the platform 62 and arm 64 may be formed with the instrument panel 14 as an integral, unitary piece. As shown, the arm 64 extends from the face 59 of the instrument panel 14 in the direction of axis 60. As a result, the rotary dial encoder 52 is located at a distance 66 from the face 59 of the instrument panel 14. Specifically, an underside 68 of the rotary dial encoder 52 facing the face 59 of the instrument panel 14 is separated from the face 59 of the instrument panel 14 by the distance 66. Further, an underside 72 of the platform 62 facing the face 59 of the instrument panel 14 is separated from the face 59 of the instrument panel 14 by the distance 74. As a result, a void 76 is defined between the face 59 of the instrument panel 14 and the underside 72 of the platform 62. The void 76 is bounded by the face 59 of the instrument panel 14, the underside 72 of the platform 62, and the arm 64. The void 76 is open to the passenger compartment 12 all along the circumference of the rotary dial encoder 52 about axis 60 except at the thickness of the arm 64. As shown, the axis 60 passes through the void 76.

As shown, a movement indicator 80 is provided on the underside 68 of the rotary dial encoder 52. The movement indicator 80 may be annular and extend around the entire periphery of the underside 68 of the rotary dial encoder 52. A sensor 82 is provided within the instrument panel 14 to communicate with the movement indicator 80. The sensor 82 is adapted to monitor rotary movement of the rotary dial encoder 52 by monitoring the movement indicator 80. Specifically, the sensor 82 is adapted to read the movement indicator 80 at a sensor reading position 84. In FIG. 3, the sensor reading position 84 is aligned with the arm 64, such that the sensor 82 reads the movement indicator through the arm 64, such as through an internal opening in the arm 64. The sensor 82 may be a capacitive, magnetic, optical, or other type of sensor. Accordingly, the movement indicator 80 may be a capacitive, magnetic, optical, or other type of appropriate indicator. For example, if the sensor 82 is an optical sensor, then the movement indicator 80 may have an optical pattern, such as a black-and-white checker board or bar code that uniquely identifies the relative rotary position of the rotary dial encoder 52, or which indicates motion of the rotary dial encoder 52.

The sensor 82 is in electronic communication with an encoder circuit 86. The encoder circuit 86 is in electronic communication with a printed circuit board 88. As is conventional, the circuit board 88 provides for control of systems for modifying operating conditions of the vehicle, such as cabin temperature, the HVAC system fan speed, the stereo volume, station, and other settings. While not shown, the circuit board 88 is connected to the HVAC system and stereo through typical circuitry and electrical connections. In certain embodiments, the sensor 82 and/or the encoder circuit 86 may be formed as part of the circuit board 88. The circuit board 88 may accommodate the sensor 82, encoder circuit 86, and other circuits for operation of the HVAC system, stereo, etc.

Through the sensor 82 and movement indicator 80, the rotary dial encoder 52 is able to communicate electronically with the encoder circuit 86. For example, the movement indicator 80 may include an optical pattern and the sensor 82 may be an optical sensor. The sensor 82 communicates either an absolute position of the rotary dial encoder 52 based on the optical pattern of the indicator 80 located at the sensor reading position 84, or a relative rotary movement of the rotary dial encoder 52 based on movement of the optical pattern of the indicator 80 through the sensor reading position 84. The encoder circuit 86 communicates the position or relative movement of the rotary dial encoder 52 to the circuit board 88 and the circuit board 88 modifies the operation of the selected operation, e.g., HVAC or stereo.

With the structure shown in FIG. 3, the sensor 82, encoder circuit 86 and circuit board 88 are encompassed by the instrument panel 14. Further, while a conventional apparatus would mount a rotary dial to a rotatable axle that physically mates with the circuit board, in the embodiment of FIG. 3, the rotary dial encoder 52 is physically disconnected from the circuit board 88. Specifically, physical rotation of the rotary dial encoder 52 about axis 60 in response to manipulation by a user in the passenger compartment 12 does not cause or drive any physical movement in or by the circuit board 88 or encoder circuit 86. Rather, the rotary dial encoder 52 is mounted on the platform 62 of the arm 64 independent of the circuit board 88. When the rotary dial encoder 52 rotatably slides on the platform 62 of the arm 64, no movement is cause in the platform 62 of the arm 64, or in the rest of the instrument panel 14. Rather, rotation of the rotary dial encoder 52 is communicated to the circuit board through optics, electronics, or magnetics.

Because the rotary dial encoder 52 does not communicate physically with the encoder circuit 86 and circuit board 88, the void 76 may be formed behind the rotary dial encoder 52 (from perspective of a user in the passenger compartment 12). Formation of the void 76 allows for a variety of aesthetic and styling choices. For example, with the relatively thin connection provided by the arm 64, the arm 64 may be hidden behind the rotary dial encoder 52 and the rotary dial encoder 52 may appear to float over the instrument panel 14. Further, the instrument panel 14 may be provided with a lighting instrument 90, such a light-emitting diode or diodes, that may be controlled by circuit board 88. The lighting instrument 90 can provide back lighting to the rotary dial encoder 52 that may be altered based on the operating condition selected, the value of the operating condition selected, that magnitude of the modification indicated by rotation of the rotary dial encoder 52, or other properties.

FIG. 3 illustrates a rotary dial encoder 52 fixed in a position separated from the face 59 of the instrument panel 14 by distance 66. In one embodiment, the distance 66 is about 0.5 to about 3 cm. Alternatively, the position of the rotary dial encoder 52 may be adjustable relative to the instrument panel 14. For example, the rotary dial encoder 52 may be moveable about the arm 64, or the arm 64 may be movable in relation to the instrument panel 14.

Figure 4:
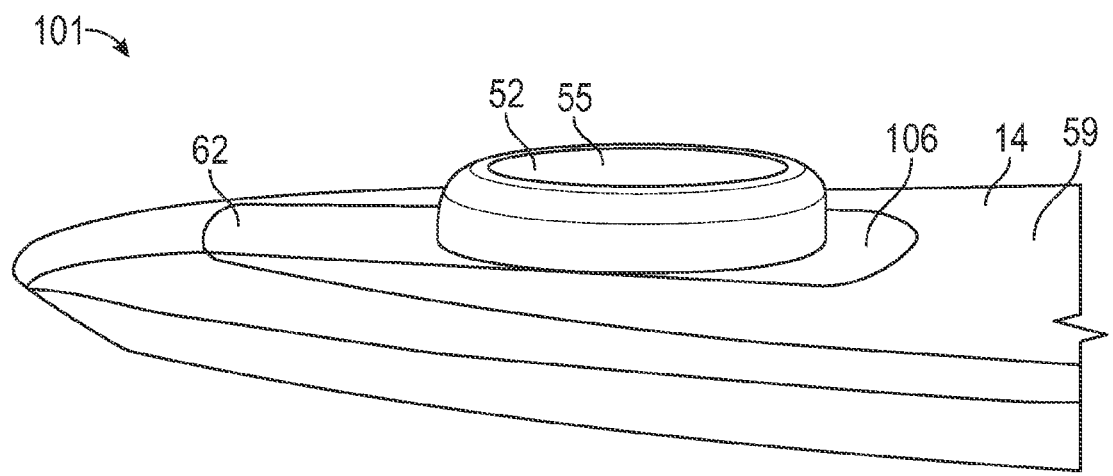
FIGS. 4-5 are perspective view illustrations of a rotary dial and vehicle instrument panel of FIG. 1 in accordance with another embodiment.
Figure 5:
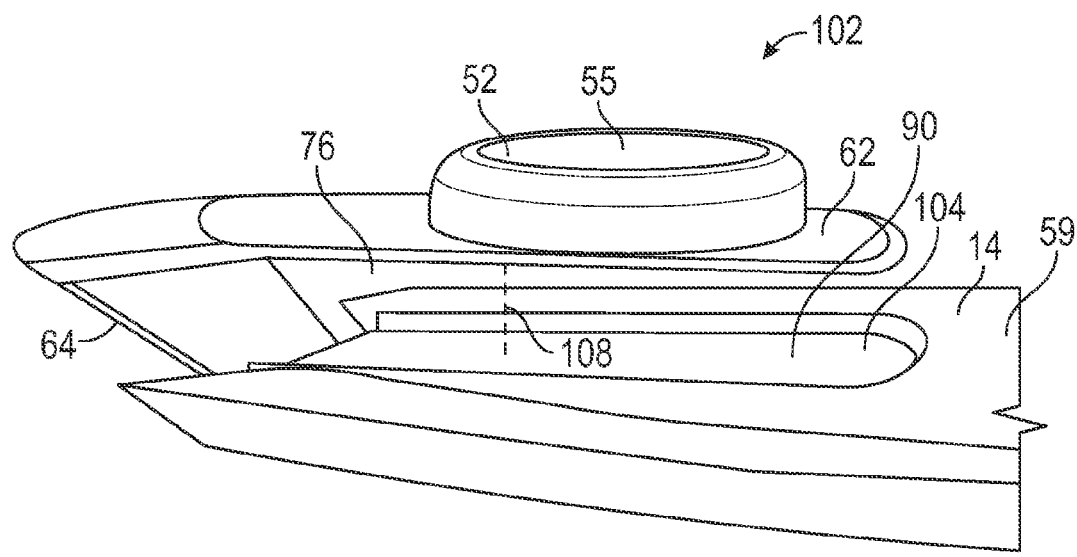

For example, FIGS. 4-5 illustrate an embodiment in which the rotary dial encoder 52 is movable between a retracted position 101 (in FIG. 4) and an extended position 102 (in FIG. 5). While the design of features in FIGS. 4-5 is different from those of FIG. 3, it is to be understood that the non-articulating embodiment of FIG. 3 may be used with the design of FIGS. 4-5 and the articulating embodiment of FIGS. 4-5 may be used with the design of FIG. 3. In FIGS. 4-5, the instrument panel 14 includes a pocket 104. The pocket 104 is sized to receive the platform 62 when the rotary dial encoder 52 is in the retracted position 101. As shown, the platform 62 includes an outer surface 106 that is flush with the outer face 59 of the instrument panel 14 when the rotary dial encoder 52 is in the refracted position 101. A lighting instrument 90 is positioned in the pocket 104 of the instrument panel 14 to illuminate the underside of the platform 62 and rotary dial encoder 52. Portions of the platform 62 and rotary dial encoder 52 may be transparent to allow light from the lighting instrument 90 to pass through. In other embodiments, the pocket 104 is sized to receive the rotary dial encoder 52 in the retracted position 101. Specifically, the top face 55 of the rotary dial encoder 52 is flush with the outer face 59 of the instrument panel 14 when the rotary dial encoder 52 is in the retracted position. In such an embodiment, the platform 62 may have a footprint or circumference equal to or smaller than the footprint or circumference of the rotary dial encoder 52.

As shown in FIGS. 4-5, the void 76 between the underside of the platform 62 and the face 59 of the instrument panel 14 is present when the rotary dial encoder 52 is moved to the extended position 102. When the rotary dial encoder 52 is moved to the retracted position 101, the void may be filled by the platform 62. In such case, a distance between the rotary dial encoder 52 and the face 59 of the instrument panel 14 may be zero. When extended to the extended position 102, a distance 108 is defined between the rotary dial encoder 52 and the instrument panel 14. In one embodiment, the distance 108 is about 0.5 to about 3 cm.

The arm 64 is adapted to articulate between the retracted position 101 and the extended position 102. Such articulation may be provided through conventional design, such as by a sliding interaction between a reciprocating notch and groove provided on the arm 64 and the instrument panel 14. Articulation of the arm 64 to the extended position 102 may be instigated by pushing the platform 64 to move the notch/groove from a retracted position to an extended position. A spring or other biasing means may be provided to extend the arm 64 outward to the extended position 102. The rotary dial encoder 52 may be returned to the retracted position 101 by the user pushing the platform 62 to the instrument panel 14. A locking mechanism may be provided to hold the rotary dial encoder 52 in the extended position 102, and may be released by the user to move the rotary dial encoder 52 to the retracted position 101.

Alternatively, movement of the rotary dial encoder 52 between the retracted position 101 and the extended position 102 may be controlled electronically. For example, a motor may be used to extend and retract the arm 64 between the positions 101 and 102. The motor may be in electronic communication with and controlled by the control board. Further, the top face 55 of the rotary dial encoder 52 may be pushed or otherwise manipulated to signal the control board to extend the rotary dial encoder 52 to the extended position 102 for use. A corresponding physical manipulation may be used to signal the control board to retract the rotary dial encoder 52 to the retracted position 101.

Each of the embodiments provided herein allows for enhanced aesthetics of the rotary dial encoder 52 by providing the rotary dial encoder 52 at an extended position from the instrument panel 14, whether fixed or adjustable. As a result, a void is defined between the rotary dial encoder 52 and the instrument panel 14. The void provides for use of back-lighting and other design considerations to alter the perception of the rotary dial encoder 52 by a user in the passenger compartment of the automobile. Further, positioning the rotary dial encoder 52 at a distance from the instrument panel 14 may facilitate use by a user in the passenger compartment of the automobile. Also, in an automobile with a plurality of rotary dial encoders 52, extension of a selected rotary dial encoder 52 to an extended position may prompt correct use by a user in the passenger compartment of the automobile, i.e., reduce dial confusion by the user.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A user interface for controlling automobile equipment, the user interface comprising:
   a circuit board accommodating an encoder circuit;
   a dial mounted independent of the circuit board, wherein the dial is moveable in response to manipulation by a user of the automobile equipment, wherein the dial communicates electronically with the encoder circuit;
   an instrument panel; and
   a sensor encompassed by the instrument panel and in electrical communication with the encoder circuit, wherein the sensor is adapted to monitor rotary movement of the dial.

2. The user interface of claim 1 further comprising an arm extending from the instrument panel, wherein the dial is mounted to the arm.

3. The user interface of claim 1 further comprising an arm extending from the instrument panel, wherein the dial is mounted to the arm, and wherein a void is defined between the dial and the instrument panel adjacent the arm.

4. The user interface of claim 1 wherein the dial is mounted to the instrument panel.

5. The user interface of claim 1 wherein the dial has a retracted position at a first distance from the instrument panel and an extended position at a second distance from the instrument panel greater than the first distance.

6. The user interface of claim 1 wherein sensor is capacitive, magnetic, or optical.

7. The user interface of claim 1 further comprising:
   an arm extending from the instrument panel, wherein the dial is mounted to the arm; and wherein the sensor is encompassed by the instrument panel and the arm.

8. An automobile instrument comprising:
   an instrument panel having a front surface;
   an arm extending from the front surface of the instrument panel;
   a rotary dial mounted to the arm and separated from the front surface of the instrument panel by a distance, wherein a void is defined between the front surface of the instrument panel and the rotary dial.

9. The automobile instrument of claim 8 wherein the rotary dial is adapted to rotate above an axis, and wherein the axis passes through the void.

10. The automobile instrument of claim 8 further comprising a circuit board accommodating an encoder circuit, wherein the circuit board is encompassed by the instrument panel and wherein the rotary dial communicates electronically with the encoder circuit.

11. The automobile instrument of claim 8 further comprising a circuit board accommodating an encoder circuit, wherein the circuit board is encompassed by the instrument panel, wherein the rotary dial communicates electronically with the encoder circuit, and wherein the rotary dial is physically disconnected from the circuit board.

12. The automobile instrument of claim 8 wherein the rotary dial has an extended position in which the rotary dial is separated from the front surface of the instrument panel by the distance, and wherein the rotary dial has a retracted position in which the distance is reduced.

13. The automobile instrument of claim 8 further comprising:
   a platform connected to the arm, wherein the rotary dial is mounted to the platform, and wherein portions of the rotary dial are transparent; and
   a lighting instrument connected to the instrument panel and adapted to shine light through the transparent portions of the rotary dial.

14. The automobile instrument of claim 8 further comprising a sensor encompassed by the instrument panel, wherein the sensor is adapted to monitor rotary movement of the rotary dial, and wherein sensor is capacitive, magnetic, or optical.

15. The automobile instrument of claim 8 further comprising a sensor encompassed by the instrument panel, wherein the sensor is adapted to monitor rotary movement of the rotary dial.

16. An automobile comprising:
   a passenger compartment;
   an instrument panel adjacent the passenger compartment;
   a circuit board accommodating an encoder circuit, the circuit board positioned within the instrument panel; and
   a rotary dial mounted independent of the circuit board, wherein the rotary dial is moveable in response to manipulation by a user, wherein the rotary dial has a retracted position at a first distance from the instrument panel and an extended position at a second distance from the instrument panel greater than the first distance, and wherein the rotary dial communicates electronically with the encoder circuit.

17. The automobile of claim 16 further comprising a sensor encompassed by the instrument panel and in electrical communication with the encoder circuit, wherein the sensor is adapted to monitor rotary movement of the dial.

18. The automobile of claim 16 further comprising an arm extending from the instrument panel, wherein the rotary dial is mounted to the arm, and wherein a void is defined between the rotary dial in the extended position and the instrument panel adjacent the arm.

19. The automobile of claim 16 further comprising a sensor encompassed by the instrument panel and in electrical communication with the encoder circuit, wherein the sensor is adapted to monitor rotary movement of the dial.

20. The automobile of claim 16 further comprising a sensor encompassed by the instrument panel and in electrical communication with the encoder circuit, wherein the sensor is adapted to monitor rotary movement of the rotary dial, and wherein the sensor is capacitive, magnetic, or optical.

\* \* \* \* \*